(12) United States Patent
Vuillerod et al.

(10) Patent No.: US 9,641,049 B2
(45) Date of Patent: May 2, 2017

(54) FIN AND INSTALLATION FOR CONVERTING HYDRAULIC-ENERGY COMPRISING SUCH A FIN

(75) Inventors: Gerard Vuillerod, Grenoble (FR); Farid Mazzouji, Vourey (FR); Yoann Bomchil, Fontaine (FR)

(73) Assignee: ALSTOM Renewable Technologies, Grenoble (FR)

( * ) Notice: Subject to any disclaimer, the term of this patent is extended or adjusted under 35 U.S.C. 154(b) by 0 days.

(21) Appl. No.: 13/825,004

(22) PCT Filed: Feb. 27, 2012

(86) PCT No.: PCT/EP2012/053283
§ 371 (c)(1),
(2), (4) Date: Jun. 19, 2013

(87) PCT Pub. No.: WO2012/116958
PCT Pub. Date: Sep. 7, 2012

(65) Prior Publication Data
US 2013/0264826 A1    Oct. 10, 2013

(30) Foreign Application Priority Data

Feb. 28, 2011    (FR) ..................... 11 51606

(51) Int. Cl.
| | | |
|---|---|---|
| F01D 15/10 | (2006.01) | |
| F02C 6/00 | (2006.01) | |
| H02K 7/18 | (2006.01) | |
| H02P 9/04 | (2006.01) | |
| F03B 13/10 | (2006.01) | |
| F03B 11/00 | (2006.01) | |

(Continued)

(52) U.S. Cl.
CPC .......... *H02K 7/1823* (2013.01); *F03B 11/002* (2013.01); *Y02E 10/226* (2013.01); *Y02E 10/28* (2013.01)

(58) Field of Classification Search
USPC .......................... 290/1 R, 40 A, 52; 415/116
See application file for complete search history.

(56) References Cited

U.S. PATENT DOCUMENTS

| | | | |
|---|---|---|---|
| 2,300,748 A | 11/1942 | Rheingans | |
| 3,810,717 A * | 5/1974 | Rakcevic | ...................... 417/323 |
| 4,142,825 A | 3/1979 | Koeller | |

(Continued)

FOREIGN PATENT DOCUMENTS

| | | |
|---|---|---|
| FR | 2942274 A1 | 8/2010 |
| JP | 55-064471 U | 5/1980 |

OTHER PUBLICATIONS

International Search Report, dated Mar. 26, 2012, which issued during the prosecution of International Patent Application No. PCT/EP2012/053283, of which the present application is the national phase.

(Continued)

*Primary Examiner* — Pedro J Cuevas
(74) *Attorney, Agent, or Firm* — Dority & Manning, P.A.

(57) ABSTRACT

This fin is intended to be installed in a protruding manner inside a discharge pipe of a hydraulic machine. The fin includes a first face which has holes and a second face which is solid. The fin defines by itself, between the first face and the second face, a cavity connecting the outside of the discharge pipe to the holes in the first face.

19 Claims, 2 Drawing Sheets

(51) Int. Cl.
  *F02B 63/04* (2006.01)
  *F02B 7/08* (2006.01)

(56) References Cited

U.S. PATENT DOCUMENTS

| | | | |
|---|---|---|---|
| 4,142,826 A | 3/1979 | Koeller | 415/116 |
| 4,514,138 A * | 4/1985 | Inagaki et al. | 415/1 |
| 5,312,231 A * | 5/1994 | Nitta | 417/86 |
| 7,059,824 B2 * | 6/2006 | Ramacciotti | 415/11 |
| 8,801,365 B2 * | 8/2014 | Bertea | F04D 29/047 384/100 |
| 8,834,102 B2 * | 9/2014 | Bremond | F03B 3/02 415/150 |
| 2009/0272548 A1 * | 11/2009 | Moynihan | 169/13 |
| 2011/0110764 A1 * | 5/2011 | Bertea | F04D 29/047 415/142 |
| 2011/0293400 A1 * | 12/2011 | Bremond et al. | 415/1 |

OTHER PUBLICATIONS

Office Action (Notification of Reasons for Refusal) issued on Jun. 30, 2014, by the Japan Patent Office in corresponding Japanese Patent Application No. 2013-554916, and a English translation of the Office Action. (4 pages).

* cited by examiner

FIN AND INSTALLATION FOR CONVERTING HYDRAULIC-ENERGY COMPRISING SUCH A FIN

CROSS-REFERENCE TO RELATED APPLICATIONS

The present application is a National Stage of International Application No. PCT/EP2012/053283 filed Feb. 27, 2012, which published as WO 2012/116958 on Sep. 7, 2012. The international application claims priority to French Application No. 1151606, filed Feb. 28, 2011. All applications above are incorporated herein by reference.

FIELD OF THE INVENTION

The present invention relates to an installation for converting hydraulic energy into electrical or mechanical energy, such an installation comprising a hydraulic turbine, a pipe for conveying to the turbine a forced flow of water and a pipe for discharging this flow when it leaves the turbine.

BACKGROUND

In such an installation for producing electrical or mechanical energy from hydraulic energy, one of the difficulties is controlling the level of oxygen dissolved in the water discharge pipe. For ecological reasons, this oxygen level must not be less than a minimum threshold in order to respect the aquatic environment downstream of the installation.

However, it is difficult to control this oxygen level since it varies during the course of the seasons. Thus, winter water has a tendency to be laden with oxygen since it generally comes from snow melt. On the other hand, in summer, often the water stagnates upstream of the installation and has a level of dissolved oxygen that is generally too low with respect to the minimum threshold.

U.S. Pat. Nos. 2,300,748 and 4,142,825 concern a hydraulic installation including a discharge pipe for discharging a flow of water discharged from a turbine. The inside of the discharge pipe is equipped with hollow ribs. A conduit brings pressurized air inside the ribs. This air is injected into the water at the discharge from the turbine by means of holes pierced in the ribs. These devices require the use of an auxiliary apparatus for injecting compressed air into the ribs.

It is this drawback that the invention sets out particularly to remedy by proposing a fin intended to be installed projecting inside a discharge pipe of a hydraulic machine.

SUMMARY

According to the examples of the invention, the fin includes a first face that has holes and a second face that is solid. The fin defines by itself, between the first face and the second face, a cavity connecting the outside of the discharge pipe to the holes in the first face.

By virtue of the invention, the angular position of the fins is determined so as to create an overpressure on the side of the fin that faces the flow and a negative pressure on the opposite side. This negative pressure automatically sucks, through the holes in the fins, air external to the discharge pipe and injects the aspirated air into the discharged water without having any need to use an active device supplying compressed air. Moreover, it is possible to modify the angular orientation of the fins in order to vary the quantity of air that it is wished to dissolve in the flow of water passing through the installation.

Moreover, the fins may also be used in order to reduce the formation of vortices or turbulences, generally referred to as "flares", by taking account of any rotation component of the flow discharged from the turbine, which stabilizes the flow in the discharge pipe.

According to advantageous but non-obligatory aspects of the invention, such an installation may incorporate one or more of the following features, taken in any technically permissible combination:

The first face of the fin is flat. The second face of the fin is flat. The first face and the second face of the fin are parallel. The first face of the fin and the second face of the fin are opposed and are arranged on either side of a median surface of the fin.

The invention also concerns an installation for converting hydraulic energy into electrical energy, this installation includes a hydraulic machine, a pipe feeding the hydraulic machine with a forced flow of water, a pipe discharging the flow discharged from the hydraulic machine and elements projecting from a wall of the discharge pipe that each define a cavity connecting the outside of the discharge pipe to holes formed in the projecting elements. In accordance with the invention the projecting elements have at least one fin according to the examples of the invention, installed projecting inside the discharge pipe, which is able to move in rotation about an axis secant to the wall of the discharge pipe, and the installation comprises means for controlling the angular position for each fin about its rotation axis.

Advantageously, but non-obligatorily, at least one fin is retractable into the wall of the discharge pipe and means are able to adjust the extent to which each fin is retracted into the wall.

BRIEF DESCRIPTION OF THE DRAWINGS

The invention will be better understood and other advantages thereof will emerge more clearly in the light of the following description of an installation in accordance with the principle thereof, given solely by way of example and made with reference to the accompanying drawings, in which.

DETAILED DESCRIPTION

Figure 1:
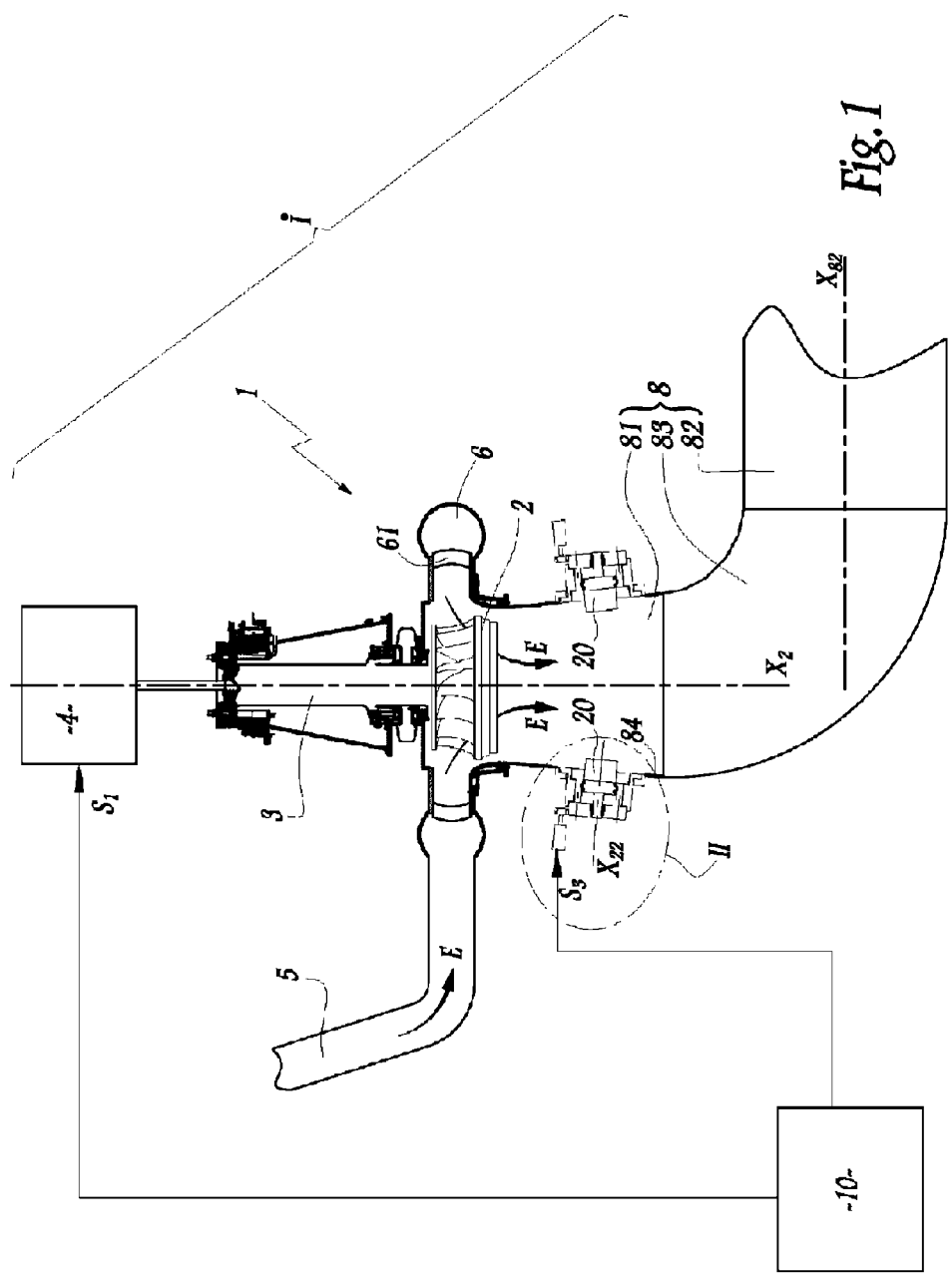
FIG. 1 is a schematic outline representation, in section, of an installation according to the invention.

The installation I shown in FIG. 1 includes a turbine 1 which in one example can be a Francis turbine, a wheel 2 of which is intended to be rotated, about a vertical axis $X_2$, by a forced flow of water E coming from a water barrage, not shown. A shaft 3, secured to the wheel 2, is coupled to an alternator 4 that delivers an alternating current at fixed frequency to a network, not shown. The installation I therefore converts the hydraulic energy of the flow E into electrical energy. The installation I may include several turbines 1 supplied from the water barrage.

In a variant, the shaft 3 may be coupled to a mechanical assembly, in which case the installation I converts the hydraulic energy of the flow E into mechanical energy.

A feed conduit 5 brings the flow E to the wheel 2 and extends between the water barrage and a tank 6 equipped with vanes 61 that regulate the flow 3.

A pipe 8 is provided downstream of the turbine 1 in order to discharge the flow E and return it to the bed of a river or stream from which the water barrage is fed. This discharge pipe 8 is sometimes termed an aspiration pipe.

A control unit 10 is provided for controlling the turbine 1 according in particular to the electricity requirements of the network supplied from the alternator 4 and the flow rate of water available for the flow E. To do this, the control unit 10 sends to the vanes 61 a control signal $S_1$ for adjusting the flow rate of water passing into the machine and therefore the power restored by the alternator 4 in order to satisfy the requirements of the electrical network.

The pipe 8 includes a substantially vertical upstream part 81, frustoconical and centered on the rotation axis $X_2$ of the wheel 2. The pipe 8 also has a downstream part 82 centered on a substantially horizontal axis $X_{82}$. This axis $X_{82}$ is substantially horizontal in that it forms an angle of less than 20° with a horizontal plane. In practice, the axis $X_{82}$ may be slightly rising in the direction of the flow E. An elbow 83, at 90°, connects the parts 81 and 82 of the pipe 8.

The pipe 8 is provided, in its upstream part 81, with several fins 20 that project, from the wall 84 of the upstream part 81, in the direction of the axis $X_2$. These fins 20 are intended to be swept by part of the flow E that flows, emerging from the wheel 2, along the wall 84. The fins 20 are attached, or in other words they do not form part of the pipe 8 and are connected to the pipe 8.

FIG. 1, which is a cross section in a vertical plane having the axis $X_2$, shows two fins 20 but in practice the number of fins 20 may be greater than 2. This number is chosen according to the diameter of the upstream part 81 and the flow rate provided for the flow E.

Figure 4:
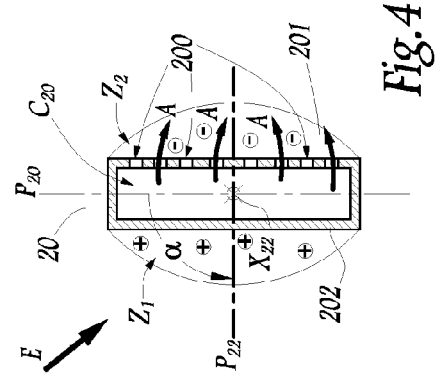
FIG. 4 is a section, along the line IV-IV in FIG. 3, showing the fin in a flow of water in the installation of FIG. 1.
Figure 2:
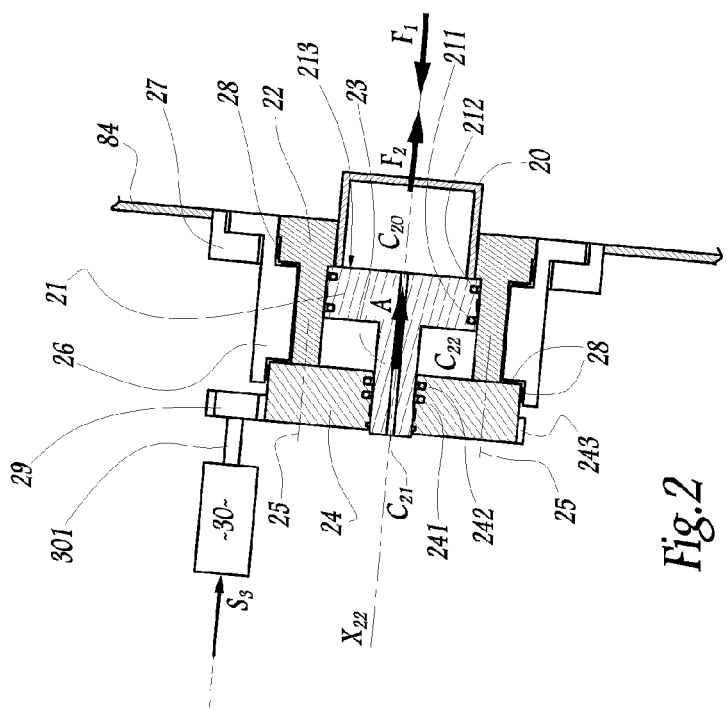
FIG. 2 is a view to a larger scale corresponding to detail II in FIG. 1, showing in section a fin and means of holding the fin, which form part of the installation in FIG. 1.

As shown more particularly by FIGS. 2 and 4, each fin 20 is hollow and comprises two parallel opposite flat lateral faces 201 and 202, disposed on either side of a mid-plane $P_{20}$ situated between the lateral faces 201 and 202. The mid-plane $P_{20}$ is a median surface of the fin 20. A first lateral face 201 of each fin 20 is pierced with several holes 200 that communicate with a cavity $C_{20}$, defined inside the fin 20, between the lateral faces 201 and 202. A second lateral face 202 of each fin 20 is solid, that is to say it does not have any holes.

Each fin 20 defines by itself a cavity $C_{20}$, or in other words each cavity $C_{20}$ is entirely formed by a fin 20. For example, the cavity $C_{20}$ is not formed by a part of the discharge pipe 8.

As is illustrated more particularly in FIG. 2, each fin 20 is secured to a piston 21 mounted in a cylindrical body 22 with a circular base, centered on an axis $X_{22}$ perpendicular to the wall 84. The piston 21 is equipped with seals 211 and 212 and is secured to a rod 23 that passes through a plate 24 in the form of a disc, with the possibility of sliding with respect to this plate along the axis $X_{22}$, as indicated by the arrows $F_1$ and $F_2$. The piston 21 and the rod 23 are pierced by a longitudinal channel $C_{21}$, centered on the axis $X_{22}$, which connects the cavity $C_{20}$ to the outside of the discharge pipe 8. The holes 200 thus communicate with the external atmosphere.

The plate 24 is equipped with seals 241 and 242 that provide, with the seals 211 and 212, the fluid isolation with respect to the outside of a chamber $C_{22}$ provided radially inside the body 22, between the plate 24 and the piston 21 and around the rod 23.

The plate 24 is fixed to the body 22 by means of screws 25, represented by their axis lines.

The chamber $C_{22}$ is supplied, through a pipe that is not shown, with water coming from the conduit 5. This makes it possible to pressurize the chamber $C_{22}$, which has the effect of pushing the piston 21 in the direction of the arrow $F_2$ and making the fin 20 project in the direction of the axis $X_2$, with respect to the wall 84. The pressure of the supply in the chamber $C_{22}$ makes it possible to control the position, along the axis $X_{22}$, of the piston 21 and fin 20. The piston 21 and fin 20 are therefore movable in translation, along the axis $X_{22}$, in the direction of the arrows $F_1$ and $F_2$ in FIG. 2. It is possible not to supply the chamber $C_{22}$ with water under pressure, so that the fin 20 is retracted or pushed in, with respect to the wall 84, outside the pipe 8, because of the pressure of the water on a face 213 of the piston 21 turned towards the pipe 8.

The subassembly formed by the pieces 20 to 25 is mounted, with the possibility of rotation about the axis $X_{22}$, in a jacket 26 immobilized in a ring 27 fixed with respect to the wall 84. The pistons 21 and the fin 20 are therefore movable in rotation about the axis $X_{22}$. Seals forming a bearing are optionally disposed radially around the body 22 and the plate 24 and enable the aforementioned subassembly to rotate with respect to the jacket 26.

In its part that projects axially, along the axis $X_{22}$, with respect to the jacket 22, the plate 24 is provided with external radial teeth 243 that mesh with a pinion 29 driven by the output shaft 301 of an electric servomotor 30. This motor is controlled by the control unit 10 by means of an electronic signal $S_3$.

The servomotor 30 therefore rotates the subassembly formed by the parts 20 to 25 about the axis $X_{22}$, according to a control signal $S_3$ received from the control unit 10. This rotation varies the angular position of the fin 20 about the axis $X_{22}$.

Figure 3:
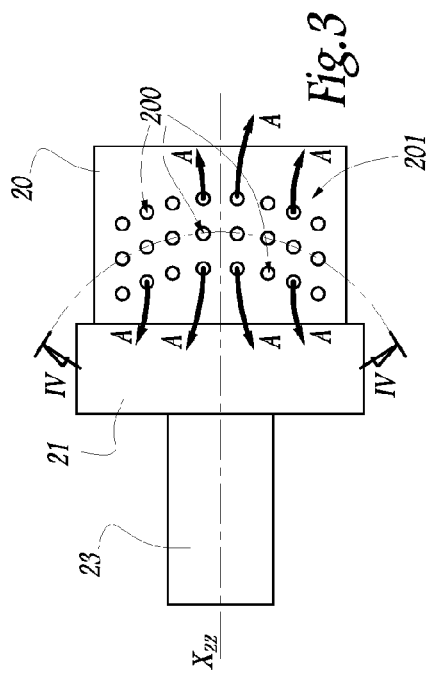
FIG. 3 is a lateral view to a larger scale of the fin in FIG. 2.

As is clear from FIG. 3, the angular position of each fin 20 can be measured by an angle $\alpha$ taken, above the axis $X_{22}$, between the mid-plane $P_{20}$ of the fin 20 and a horizontal plane $P_{22}$ containing the axis $X_{22}$. When the lateral faces 201 and 202 of the fins 20 are vertical, the angle $\alpha$ is equal to 90°.

In operation, when it is wished to dissolve air in the flow of water E discharged by the discharge pipe 8, with a view to increasing its level of dissolved oxygen, it is necessary to bring the fins 20 out into the discharge pipe 8, in the direction of the arrow $F_2$, so that the fins 20 project in the direction of the axis $X_2$, with respect to the wall 84. This movement is controlled by the control unit 10.

The angular position a of each fin 20 is adjusted so that the plane $P_{20}$ is inclined with respect to the flow E, the second face 202 of the fins 20 facing the flow E, as shown in FIG. 4. The angular position a is controlled by the control unit 10, which delivers a signal $S_3$ to the motor 30 in order to create a zone $Z_1$ under overpressure, close to the second face 202, and a zone $Z_2$ under negative pressure, close to the first face 201.

By virtue of the negative pressure in the zone $Z_2$, external air is automatically sucked in the cavity $C_{20}$ and is injected into the flow E, through the holes 200, as indicated by the arrows A in FIGS. 2 to 4.

The angular position a of the fins 20 has an influence on the intensity of the negative pressure created in the zone $Z_2$ and therefore has an influence on the quantity of air injected into the flow E.

The dimensions and number of the holes 200 are determined according to the dimension and quantity of the air bubbles that it is wished to dissolve in the flow E.

Advantageously, the fins 20 can be used to reduce the pressure fluctuations and the formation of turbulent flares that appear, in service, in the discharge pipe 8. To do this, the angle α of the fins 20 can be adjusted to modify the flow E, as taught for example by the document FR-A-2 942 274.

In a variant, the position of each fin 20 along its rotation axis $X_{22}$ can be controlled by means other than a pressure chamber supplied with water.

Depending on the geometry of the faces 201 and 202 and the arrangement of the face 201 with respect to the face 202, the surface corresponding to the mid-plane $P_{20}$ is not necessarily flat. For example, when the faces 201 and 202 are in the form of a portion of a cylinder with a circular cross section, the concave side of the faces 201 and 202 being turned to the same side, the median surface is a portion of a cylinder with circular cross section that has a radius lying between the radius of the face 201 and of the face 202.

It is possible to use, for example, an electric servomotor or a hydraulic, mechanical or electrical jack.

In a variant, at least one of the fins 20 may not be retractable. In this case, when it is wished to dissolve oxygen in the flow E, the faces 201 and 202 of these non-retractable fins 20 are oriented parallel to the flow E, in order not to disturb the flow.

The invention described above is shown in the figures in the case where the rotation axis $X_{22}$ of the fins 20 is perpendicular to the wall 84. This is not obligatory and it suffices for the axis $X_{22}$, which is fixed with respect to the wall 84, to be secant to this wall.

The invention has been shown in the case where all the fins 20 are orientable, that is to say movable in rotation about an axis secant, in particular perpendicular, to the wall 84 of the discharge pipe 84. In a variant, only some fins 20 may be orientable. In addition, only some of the fins 20 may have holes 200. These non-perforated fins 200 may be used to prevent the formation of turbulent flares.

The invention has been shown with a servomotor associated with each fin 20, which makes it possible to control the fins 20 individually. The synchronization between the movement of the fins 20 is provided by the control unit 10 and its management of the various signals $S_3$ intended for the various motors 30.

In a variant, it is possible to use mechanical means connecting together the fins 20, which provides grouped control of the fins 20. It is possible for example to use chains or a valve regulation ring as known for example for controlling the guide vanes 62.

Other devices can be envisaged for rotating the fins, with individual or grouped control of the fins 20. In practice, this rotation can be provided by any suitable actuator, for example a rotary or linear jack associated with a link. The jacks may be actuated by oil, an electric current, compressed air or water.

The invention has been shown in its application with a turbine of the Francis type. It is however applicable to other types of turbine, such as Kaplan turbines and turbines of the screw type, as well as pump turbines.

The invention claimed is:

1. A fin projecting in a discharge pipe of a hydraulic machine, wherein the fin comprises:
    a first face that comprises holes;
    a second face evenly spaced from the first face along its length, the second face being solid;
    a cavity defined in the fin between the first face and the second face, the cavity defining a hollow interior defined by the evenly spaced apart first and second faces;
    a channel connecting the cavity with air from outside of the discharge pipe; and
    wherein the fin is installed projecting inside the discharge pipe and is configured to rotate about an axis secant to the wall of the discharge pipe to an angular position such that a low pressure condition established at the first face draws the air from outside the discharge pipe through the channel, into the cavity, and out through the holes in the first face; and
    wherein the holes are aligned along an arc having a center positioned on a longitudinal axis of the channel.

2. The fin according to claim 1, wherein the first face of the fin is flat.

3. The fin according to claim 1, wherein the second face of the fin is flat.

4. The fin according to claim 1, wherein the first face and the second face of the fin are parallel.

5. The fin according to claim 1, wherein the first face and the second face of the fin are disposed on either side of a median surface of the fin.

6. The fin according to claim 1, comprising:
    a cylindrical rod having a longitudinal channel, which connects the cavity and the holes in the first face to external ambient air from outside of the discharge pipe.

7. An installation converting hydraulic energy into electrical energy, comprising:
    a hydraulic machine;
    a pipe feeding the hydraulic machine with a forced flow of water;
    a pipe discharging the flow discharged from the hydraulic machine; and
    elements projecting from a wall of the discharge pipe that each define a cavity connecting the outside of the discharge pipe to holes formed in the projecting elements, the installation being wherein the projecting elements comprise at least one fin, that at least one fin includes a first face that comprises holes and a second face that is solid and evenly spaced from the first face along its length such that the cavity is defined between the first face and the second face, the cavity defining a hollow interior defined by the evenly spaced apart first and second faces, a channel connecting the cavity with air from outside of the discharge pipe, the holes being aligned along an arc having a center positioned on a longitudinal axis of the channel, the at least one fin installed projecting inside the discharge pipe, which is able to move in rotation about an axis secant to the wall of the discharge pipe and in that the installation comprises controllers controlling an angular position of each fin about its rotational axis.

8. The installation according to claim 7, wherein at least one fin is retractable in the wall of the discharge pipe and in that adjustors are able to adjust a degree to which each fin is retracted in the wall.

9. An installation converting hydraulic energy into electrical energy, comprising:
    a hydraulic machine;
    a pipe feeding the hydraulic machine with a forced flow of water;
    a pipe discharging the flow discharged from the hydraulic machine; and
    at least two fins projecting from a discharge pipe, each of the at least two fins comprising:

a first face that comprises holes; and a second face that is solid and evenly spaced from the first face along its length such that a cavity is defined between the first face and the second face, the second face being solid, the cavity defining a hollow interior defined by the evenly spaced apart first and second faces, a channel connecting the cavity and the holes in the first face to air outside of the discharge pipe, the holes being aligned along an arc having a center positioned on a longitudinal axis of the channel, and wherein each of the at least two fins projects inside the discharge pipe and is configured to rotate about an axis secant to the wall of the discharge pipe to an angular position such that a low pressure condition established at the first face draws the air from outside the discharge pipe through the channel, into the cavity, and out through the holes in the first face.

10. The installation according to claim 9, comprising:
controllers configured to control an angular orientation of each of the at least two fins about its rotation axis.

11. The installation according to claim 9, wherein each of the at least two fins is retractable in the wall of the discharge pipe and adjustors are able to adjust a degree to which each fin is retracted in the wall.

12. The installation according to claim 9, wherein the first face of each of the two fins is flat.

13. The installation according to claim 9, wherein the second face of each of the two fins is flat.

14. The installation according to claim 9, wherein the first face and the second face of each of the two fins are parallel.

15. The installation according to claim 9, wherein the first face and the second face of each of the two fins are opposed and are disposed on either side of a median surface of the fin.

16. The installation according to claim 9, wherein dimensions of each of the two fins allow the rotation of the fin with respect to the discharge pipe within the flow of water about the axis secant to the wall of the discharge pipe.

17. The installation according to claim 9, wherein a number of the at least two fins is chosen according to a diameter of an upstream portion of the discharge pipe and a flow rate of the flow.

18. The installation according to claim 9, wherein the channel is defined by a cylindrical rod having a longitudinal channel, which connects the cavity and the holes in the first face to external ambient air from outside of the discharge pipe.

19. The installation according to claim 9, wherein each of the at least two fins is secured to a piston mounted in a cylindrical body with a circular base centered on an axis perpendicular to the wall.

* * * * *